United States Patent
Berger et al.

(10) Patent No.: US 7,727,450 B1
(45) Date of Patent: Jun. 1, 2010

(54) METHOD OF USING SHAPE MEMORY POLYMERS

(75) Inventors: Elisabeth J. Berger, Farmington Hills, MI (US); Ingrid A. Rousseau, Clinton Township, MI (US); John N. Owens, Franklin, MI (US); Hamid G. Kia, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/356,528

(22) Filed: Jan. 20, 2009

(51) Int. Cl.
*B29C 45/14* (2006.01)

(52) U.S. Cl. .................. 264/266; 264/309; 425/110

(58) Field of Classification Search .......... 425/110, 425/111; 624/266
See application file for complete search history.

(56) References Cited

U.S. PATENT DOCUMENTS

| 6,986,855 | B1 * | 1/2006 | Hood et al. .............. 264/219 |
| 2005/0211870 | A1 * | 9/2005 | Browne et al. .......... 249/134 |
| 2008/0086113 | A1 * | 4/2008 | Tenney et al. ........... 604/892.1 |

* cited by examiner

*Primary Examiner*—Kat Wyrozebski
*Assistant Examiner*—Robert J Grun
(74) *Attorney, Agent, or Firm*—Dierker & Associates, P.C.

(57) ABSTRACT

A method includes providing a shape memory polymer in a permanent shape, where the permanent shape is at least part of a predetermined part shape, converting the shape memory polymer from the permanent shape into a temporary shape, where the temporary shape is more open than the permanent shape. The method further includes spraying a material onto at least one surface of the shape memory polymer in its temporary shape and reverting the shape memory polymer, having the material on the at least one surface, back to the permanent shape.

18 Claims, 3 Drawing Sheets

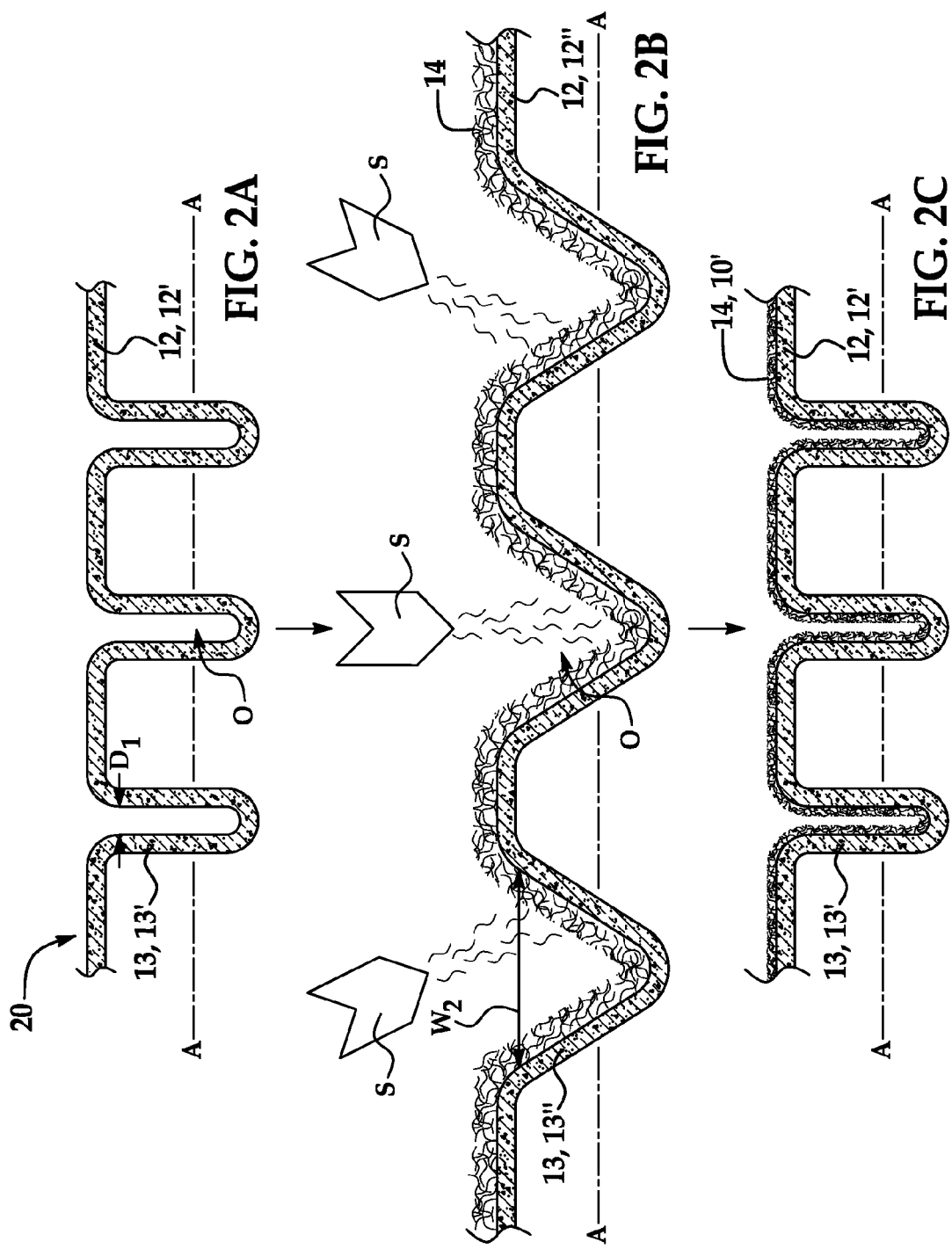

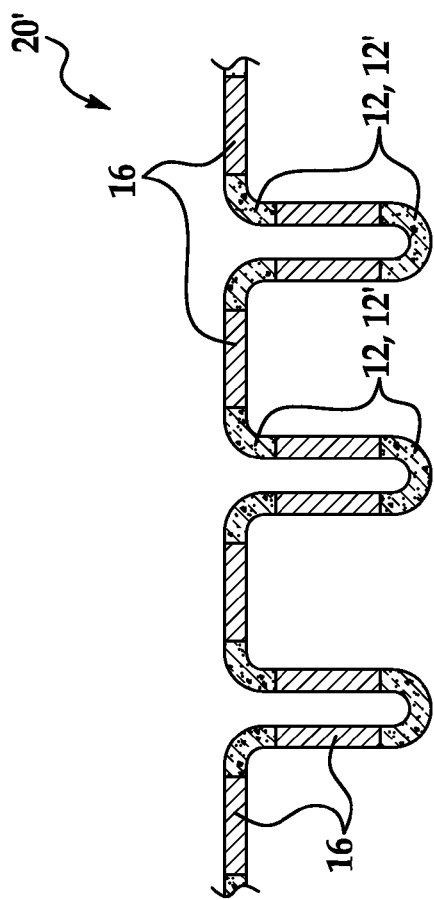
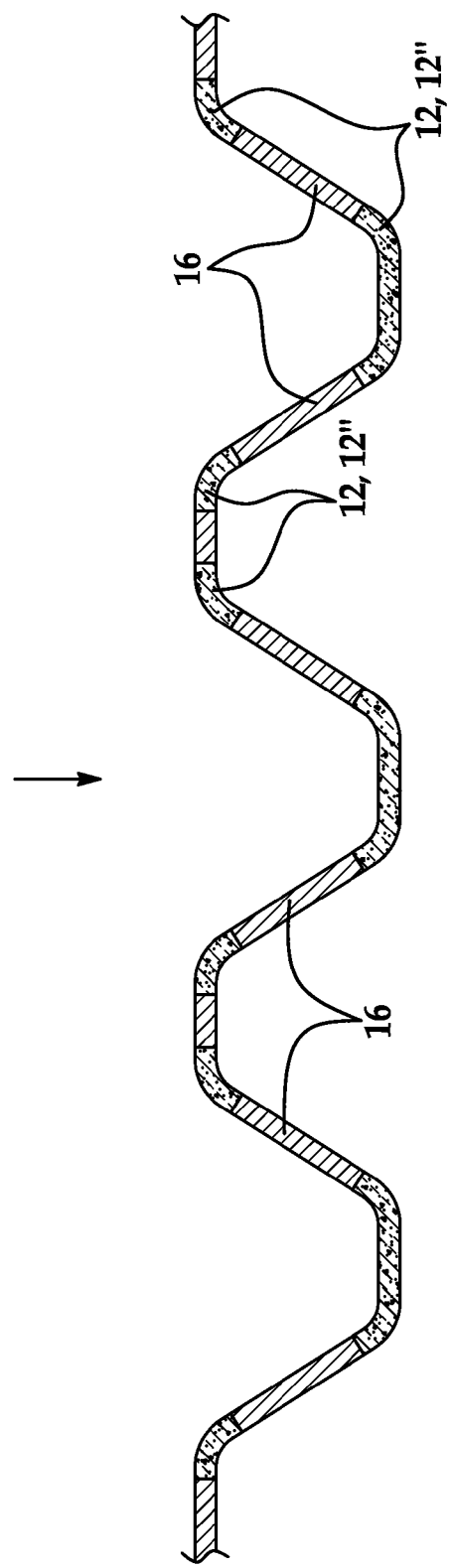

METHOD OF USING SHAPE MEMORY POLYMERS

TECHNICAL FIELD

The present disclosure relates generally to methods of using shape memory polymers.

BACKGROUND

Various automotive and/or aerospace parts including, for example, structural parts, internal cabin parts, and/or the like may be formed using conventional molding processes. One example of such a process includes reaction injection molding (RIM). In some instances, the RIM process may be used to form a part directly. Another example of a conventional molding process includes structural reaction injection molding (SRIM). In some instances, the SRIM process may be used in conjunction with a preform to form a reinforced part. Although suitable for forming parts having simple or even relatively complex shapes or geometries, forming more intricate parts (e.g., parts having one or more intricate features) using the RIM or the SRIM processes may, in some instances, be a challenge such as, for example, with maintaining dimensional targets and/or tolerances of the formed part.

SUMMARY

A method, as disclosed herein, uses a shape memory polymer in a permanent shape, where the permanent shape is at least part of a predetermined part shape. The method includes converting the shape memory polymer from the permanent shape into a temporary shape, where the temporary shape is more open than the permanent shape. A material is sprayed onto at least one surface of the shape memory polymer in its temporary shape. The shape memory polymer, having the material on the at least one surface, is reverted back into its permanent shape.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 2A through 2C together schematically depict another example of the method using shape memory polymers; and FIGS. 3A and 3B together schematically depict yet another example of the method using shape memory polymers.

DETAILED DESCRIPTION

Embodiment(s) of the method as disclosed herein may advantageously be used to i) form a preform for use in fabricating parts having one or more intricate features, ii) directly form a part having one or more intricate features, or iii) deposit a coating onto a part having one or more intricate features. As described further hereinbelow, shape memory polymers are utilized to open up the one or more intricate features, thereby enabling substantially uniform and more effective coating or establishing of materials on such features.

As used herein, an "intricate feature" refers to a portion of a part having a complex shape or geometry. Features having a "complex shape" or a "complex geometry", as the terms are used herein, generally have a shape or geometry that renders the portion/feature difficult to form or coat using conventional processes. Such shapes or geometries include, for example, crevices, dips, or curves, and in some instances, such shapes have non-consistent cross-sections. In some instances, the intricate features have relatively small dimensions which are difficult to uniformly spray with any sort of material, such as, for example, paint, part-forming materials, materials such as fibers and/or binders to make preforms, etc.

Also as used herein, the phrases "to substantially uniformly spray," "to uniformly spray," or any other suitable variation refers to spraying (or otherwise establishing) a material onto a surface of the shape memory polymer in a controlled manner. In some instances, spraying is controlled to achieve uniformity in at least one of thickness, area, or density. In other instances, spraying is controlled so that the resulting layer may not be substantially uniform in at least one of thickness, area or density (i.e., the thickness, area and/or density along the layer varies).

Figure 1A:
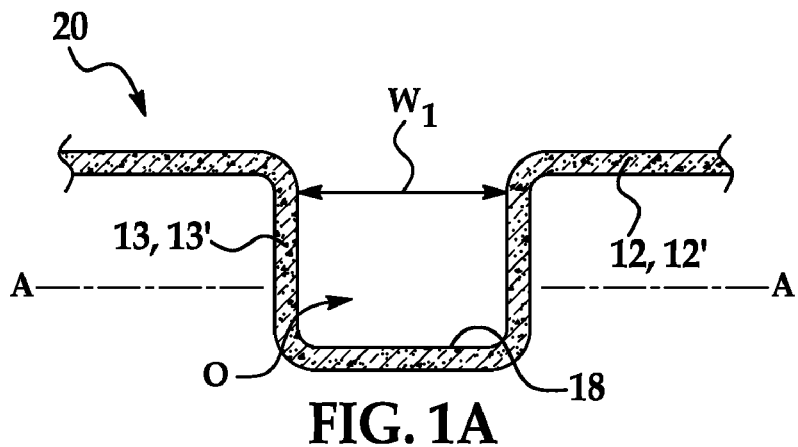
FIGS. 1A through 1C together schematically depict an example of a method using shape memory polymers.
Figure 1B:
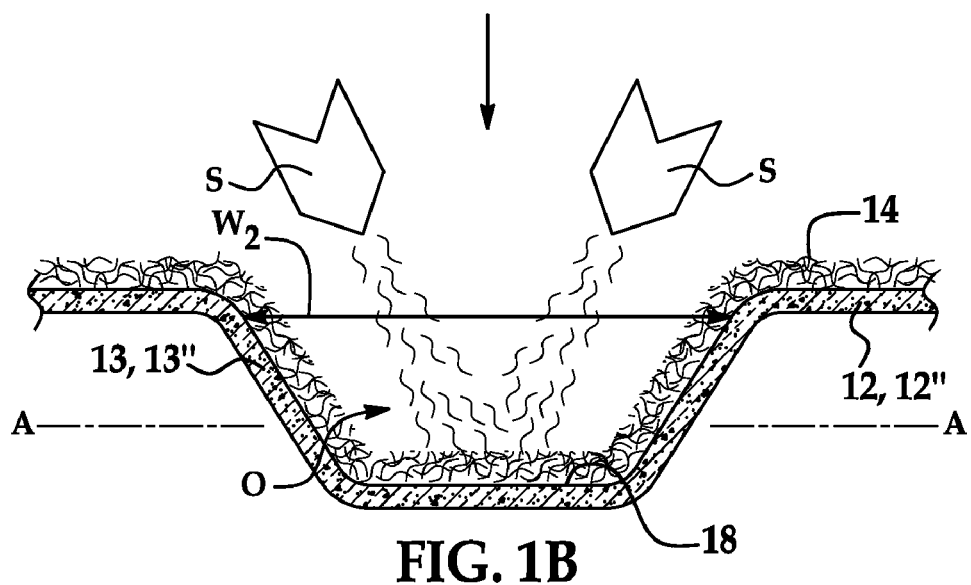
Figure 1C:
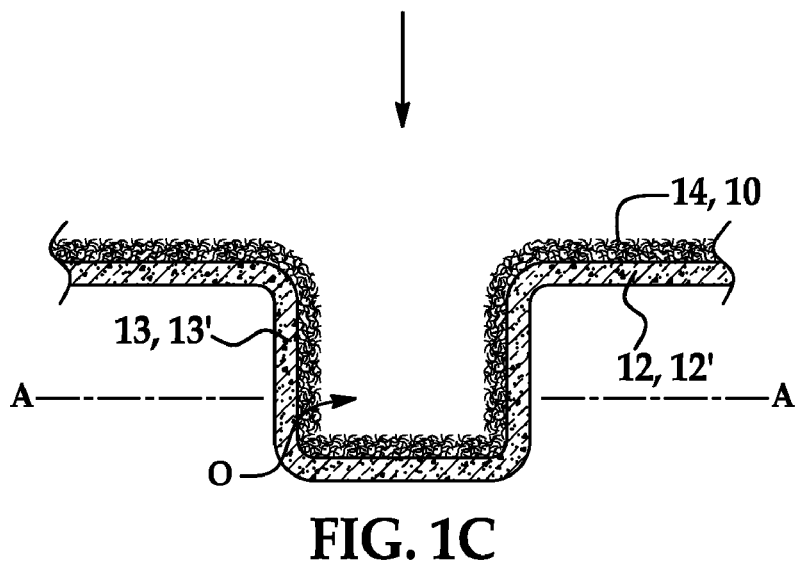

Referring now to the drawings, FIGS. 1A through 1C and FIGS. 2A through 2C schematically depict respective examples of the method. In these examples, the method is used to form a preform 10 (as shown in FIG. 1C) or 10' (as shown in FIG. 2C) having a desirable part shape. The preform 10, 10' may be used to ultimately form a part (not shown) having the desired shape using a suitable forming process.

Referring now to FIGS. 1A and 2A, these examples of the method use a shape memory polymer 12 as a preform screen 20. The shape memory polymer 12 has i) a permanent shape that is at least part of a predetermined part shape (the permanent shape being referred to herein as reference numeral 12'), and ii) a temporary shape that is more open than the permanent shape (the temporary shape being referred to herein as reference numeral 12"). As used herein, the phrase "predetermined part shape" refers to the desirable shape of the ultimately formed part. In the examples shown in FIGS. 1A through 1C and in FIGS. 2A through 2C, the preform 10, 10' is formed having the predetermined part shape. It is to be understood that the shape memory polymer 12 (in this example a preform screen 20) used to form the preform 10, 10' has a pattern that enables the formation of the predetermined part shape. In some instances, the shape memory polymer 12 may have the predetermined part shape, but may be larger than the actual preform 10, 10' to be formed. In one example, the shape memory polymer 12 would have the same shape as at least one surface of the preform 10, 10' (and thus the resulting part). For instance, if the preform 10, 10' is used to form the final part (but is not a component of the final part), then at least one surface of the preform 10, 10' has the desirable part shape and dimensions. As such, the shape memory polymer 12, 12' has a surface that enables the preform 10, 10' to be formed with the desirable shape and dimensions. In another instance, if the shape memory polymer 12, 12' or preform 10, 10' remains a component of the final part, then the shape memory polymer 12, 12', in its permanent shape will have the part shape and dimensions minus the thickness of the preform 10, 10' and of the material sprayed thereon to form or coat the part.

Since the methods disclosed herein may also be used to form a final part or a layer of a final part, the shape memory polymer 12 may be a mold for preforming or molding the final part, or a portion of the final part, as opposed to the preform screen 20 discussed herein. It is to be understood that the shape memory polymer 12 will be configured accordingly to have the desired part shape or to enable formation of the desired part shape.

The phrase "more open", when used to describe the temporary shape of the shape memory polymer 12, 12", refers to an expanded version of the permanent shape of the shape memory polymer 12, 12'. For example, if the permanent shape 12' is a V-shape having a predetermined angle formed between two legs of the "V", the "more open" temporary shape 12" has a similar V-shape with a larger angle formed between the two legs of the "V" than the predetermined angle of the "V" for the permanent shape 12'. In some instances, the temporary shape 12" is wider in lateral cross-section (along an axis A shown in the Figures) than the permanent shape 12'. It is to be further understood that, in some instances, the "more open" temporary shape 12" also refers to a shape that is shallower in transverse cross-section (relative to an axis transverse to axis A, which would be coming into and out of the page in FIGS. 1A-1C, but not shown in the Figures) than that of the permanent shape 12'.

It is to be understood that if the shape memory polymer 12 is integrated with a non-shape memory polymer material (shown as reference numeral 16 in FIGS. 3A-3B), the "more open" shape as described above will also depend, at least in part, on the placement of the shape memory polymer 12 with respect to the non-shape memory polymer material 16.

The shape memory polymer 12 includes at least one intricate feature 13. In the example shown in FIGS. 1A through 1C, the permanent shape of the shape memory polymer 12, 12' includes a channel 13', as the intricate feature 13, having a substantially consistent width $W_1$ across its depth; and the temporary shape of the shape memory polymer 12, 12" includes the channel 13" having a varying width $W_2$ across its depth. The varying width $W_2$ is larger, at least at the opening O of the feature 13, than the width $W_1$. In the example shown in FIGS. 2A through 2C, the permanent shape of the shape memory polymer 12, 12' has a plurality of ribs 13' as the intricate features 13. Each rib 13' includes a substantially consistent width $W_1$. The temporary shape of the shape memory polymer 12, 12" also includes the plurality of ribs 13", except that each rib 13" has a varying width $W_2$ along its depth. In this example, the varying width $W_2$, at least at the opening O of the feature 13, is larger than the width $W_1$. While in these Figures the width $W_1$ is shown as being substantially consistent when the polymer 12 is in its permanent shape 12', it is to be understood that the width $W_1$ may vary along the depth of the feature 13, as long as the width $W_2$ at the feature opening O is greater than the width $W_1$ at the feature opening O. It is to be understood that, in some instances, one or more of the ribs 13' may also have different widths, as opposed to a single width $W_1$. Essentially, the temporary shapes 12" open the features 13, thereby rendering such features 13 more suitable for forming a layer of material or coating thereon.

It is to be understood that the shapes 12', 12" of the shape memory polymer 12 depicted in FIGS. 1A through 1C and in FIGS. 2A through 2C are shown merely for illustrative purposes. It is to be further understood that other shapes for the shape memory polymer 12 are also within the spirit and scope of the instant disclosure.

Referring now to FIGS. 1B and 2B, the shape memory polymer 12 in its permanent shape 12' is converted into its temporary shape 12". In an example, converting the shape memory polymer 12, 12' into its temporary shape 12" is accomplished by i) heating the shape memory polymer 12 to a temperature above its switching temperature, and ii) applying a mechanical force to the heated shape memory polymer 12. In an example, depending on the type of fillers present in the shape memory polymer 12 (if any), converting the shape memory polymer 12, 12' into its temporary shape 12" may otherwise be accomplished by i) indirectly heating the shape memory polymer 12 by exposure to, for example, irradiation, magnetic fields, electric fields, or the like, and ii) applying a mechanical force to the heated shape memory polymer 12. At or above the switching temperature, the shape memory polymer 12 becomes relatively easily deformable and may be conformed into the temporary shape 12". It is to be understood that the temporary shape 12" may be achieved by applying the previously mentioned force to the shape memory polymer 12 after or during heating. It is to be further understood that the force applied to the shape memory polymer 12 is a predetermined force that will suitably deform the shape memory polymer 12 without damaging (i.e., breaking) it. A non-limiting example of such a force may be a uniaxial tension applied along axis A, causing deformation of the shape memory polymer 12 along the tension direction, thereby providing a wider, more open shape (i.e., the temporary shape 12"). In another non-limiting example, the force may be a biaxial tension that deforms, for example, the width and the length of the shape memory polymer 12 concurrently. Such biaxial deformation may, in some instances, be useful for incorporating well-like features rather than ribs 13' in the shape memory polymer 12. In yet another non-limiting example, the force may be a compression force, e.g., orthogonally or perpendicularly applied to the shape memory polymer 12 relative to the axis A to create a shallower, more open shape. For example, the compression force may be created by pressing a flat plate against the shape memory polymer 12 to achieve the more open shape.

As used herein, the term "switching temperature" of the shape memory polymer 12 refers to the temperature that causes the shape memory polymer 12 to deform, and to thus be capable of changing from its permanent shape 12' into its temporary shape 12", and visa versa. It is to be understood that the switching temperature varies depending on the type of shape memory polymer 12 selected. Non-limiting examples of suitable shape memory polymers include epoxy-based systems, acrylate-based systems, styrene-based systems, olefin-based systems, or combinations thereof. When the coating that is being applied requires subsequent curing, it is to be understood that the shape memory polymer 12 has a switching temperature greater than a curing temperature of a material 14 being coated on the polymer 12 (as will be described in further detail below). In some instances, such shape memory polymer material systems have switching temperatures ranging from about 100° C. to about 200° C. It is to be understood that any of the shape memory polymers 12 disclosed herein may be reinforced with inorganic fillers/fibers or other active materials. Non-limiting examples of suitable shape memory polymer fillers/fibers include electrically or magnetically and thermally conductive fillers/fibers, such as ferrite, magnetite, carbon fibers, carbon nanotubes, conductive polymers, and/or the like, and/or combinations thereof.

After the shape memory polymer 12 has been converted into its temporary shape 12", the shape memory polymer 12 is cooled to a temperature below its switching temperature to temporarily fix the shape memory polymer 12 into its temporary shape 12". As shown in FIGS. 1B and 2B, while the shape memory polymer 12 is temporarily fixed in its temporary shape 12", the material 14 (referred to above) is sprayed or otherwise deposited onto at least one surface (e.g., surface 18) of the shape memory polymer 12, 12". In an example, the material 14 is sprayed or otherwise applied to the surface 18 of the shape memory polymer 12, 12" using one or more sprayers S. Generally, non-limiting examples of the material 14 sprayed onto the surface 18 of the shape memory polymer 12, 12" include carbon fibers, glass fibers, polyester fibers, natural fibers (e.g., cellulose fibers (such as jute fibers, hemp fibers, kenaf fibers, and the like), silk fibers, etc.), basalt fibers, binder materials, paints, coatings, non-reinforced resins, particulate-reinforced resins, composites thereof, and/or combinations thereof (e.g., any of the previously listed fibers incorporated into a liquid resin). When forming a preform 10, 10', the material 14 may include any of the previously listed fibers and binder materials. Likewise, when forming a final part, the material 14 may include the fibers, binder materials, and/or resins. Still further, when the shape memory polymer 12 is the final part, the material 14 may include paint, a polymer coating, or any other desirable coating material for that final part.

As referred to above, when the shape memory polymer 12 is in its temporary shape 12", the shape memory polymer 12, 12" has the more open shape. The more open shape generally exposes the intricate feature(s) 13 so that the material 14 is relatively easily sprayed on the surface 18 of the shape memory polymer 12. Depending, at least in part, upon the material 14 used and the purpose for coating, the material 14 may be subjected to curing (which will be described further hereinbelow). It is to be understood that, in some instances, the sprayed layer of the material 14 is substantially uniform in thickness and in surface area, and that the opened configuration of the features 13 enables such controlled coating. It is to be further understood that the application of the material 14 may be controlled to form a layer of the material 14 that has a desirable non-uniform thickness.

In an embodiment, the shape memory polymer 12 may be perforated. In this embodiment, prior to or during spraying of the material 14 onto the surface 18, a vacuum may be drawn from behind the surface 18. It is to be understood that the use of the vacuum assists in maintaining, for example, fibers or other materials 14 on the surface 18.

Referring now to FIGS. 1C and 2C, the shape memory polymer 12, 12" (in its temporary shape, as shown in FIGS. 1B and 2B) including the material 14 sprayed thereon is reverted back into its permanent shape 12'. In an embodiment, reverting the shape memory polymer 12 in its temporary shape 12" back into its permanent shape 12' is accomplished by heating the shape memory polymer 12 to a temperature above its switching temperature. It is to be understood that in instances where the material 14 has a curing temperature below the switching temperature of the shape memory polymer 12, when the shape memory polymer 12 is heated, the material 14 will be cured to form the preform 10, 10'. The material 14 generally dictates the appropriate parameters for curing (i.e., time and temperature). Accordingly, the material 14 is selected in order to target appropriate curing kinetics, therefore substantially dis-allowing premature setting (or curing) into a shape (somewhere between the temporary shape 12" and the permanent shape 12') before the shape memory polymer 12 has been completely reverted back into its permanent shape 12". It is to be further understood that in instances where the material 14 has a curing temperature that is higher than the switching temperature, the material 14 may be cured subsequent to the reversion. In these instances, however, structural reinforcements may be applied to the shape memory polymer 12 to prevent possible deformations resulting from the high curing temperature. In either case, after the shape memory polymer 12 is reverted back into its permanent shape 12', the shape memory polymer 12, 12' is fixed in its permanent shape 12' by cooling the shape memory polymer 12 to a temperature below its switching temperature.

After the preform 10, 10' has been formed (i.e., after the material 14 is cured), the preform 10, 10' may be removed from the preform screen 20 (i.e., the shape memory polymer 12). In a non-limiting example, removal of the preform 10, 10' may be accomplished by heating the shape memory polymer 12 above its switching temperature to render the preform screen 20/shape memory polymer 12 deformable, and then separating the deformed shape memory polymer 12 from the preform 10, 10'. It is to be understood, that such removal may be accomplished for any shapes of the shape memory polymer 12. It is further to be understood that if the shape of the shape memory polymer 12 does not include any intricate features (i.e., those that would normally render the shape memory polymer 12 die-locked in (i.e., non-removable from) the preform screen 20), removal of the preform 10, 10' may, in some instances, be accomplished without the heating and the deforming steps.

To reiterate from above, the preform 10, 10', having the predetermined part shape, may be used in a subsequent process for forming the part. In a non-limiting example, the part may be formed using a conventional molding process, examples of which include compression molding, injection molding, extrusion molding, and/or the like. Furthermore, the shape memory polymer 12 (in these examples used as a preform screen 20) may be reused to form another preform 10, 10' having the desired part shape. If a thermoplastic material is used for the shape memory polymer 12, and if, for example, another part shape is desired, the shape memory polymer 12 may be reshaped and set into a new permanent shape. This may be accomplished, for example, using a suitably shaped mold and a heating and cooling sequence, where heating is accomplished above the highest melting transition temperature of the thermoplastic material. The examples of the method described above may then be used to form another preform using the reshaped shape memory polymer preform screen 12, 20 formed from the thermoplastic material. It is to be understood that the shape memory polymer 12 formed of a thermoplastic material may similarly be reshaped when it is used as a mold for forming the final part.

It is to be understood that if a thermoset material is used for the shape memory polymer 12, then a new permanent shape cannot be programmed. In other words, although the shape memory polymer 12 formed from a thermoset material may be used a number of times to produce the same, unique part, it is to be understood that such shape memory polymer 12 formed from a thermoset material cannot be reprogrammed in a different permanent shape.

Furthermore, when the shape memory polymer 12 is used as a layer for forming a final part, it becomes a portion of the final part, and thus will not be reshaped.

Another example of the coating method is shown in FIGS. 3A and 3B. In this example, the shape memory polymer 12, in conjunction with another material 16, form, for example, the preform screen 20' used to make a preform (not shown). It is to be understood, however, that the shape memory polymer 12 and other material 16 may form other non-perforated molds (or layers in instances where the shape memory polymer 12 becomes part of the final part) instead of the preform screen 20'. Non-limiting examples of such non-perforated molds include a mold for forming interior automotive parts, a mold for thermoforming a paint film for exterior portions of an automobile, and/or the like.

Referring now to FIG. 3A, the shape memory polymer 12 is integrated with a non-shape memory material 16 such that the shape memory polymer in its permanent shape 12' and the non-shape memory material 16 together form the predetermined part shape. The non-shape memory material 16 (as denoted by its name) is a material not having shape memory characteristics. Non-limiting examples of suitable non-shape memory materials include a perforated metal, a perforated non-shape memory polymer, a perforated ceramic, perforated glass, or combinations thereof. In instances where the preform screen 20' becomes part of the final part (i.e., is not used as a preform screen) the non-shape memory material 16 may be selected from perforated or non-perforated materials. It is to be understood that such non-shape memory materials are also selected to have a melting temperature above the switching temperature of the shape memory polymer 12. This higher melting temperature generally keeps the non-shape memory material 16 from changing phase when the shape memory polymer 12 is heated to either i) convert the shape memory polymer 12 from its permanent shape 12' into its temporary shape 12", or ii) revert the shape memory polymer 12 back into its permanent shape 12' from its temporary shape 12".

As shown in FIG. 3B, when the shape memory polymer 12 is converted from its permanent shape 12' into its temporary shape 12", the preform screen 20' (including both the shape memory polymer 12 and the non-shape memory material 16) converts to a more open shape. As such, the shape memory polymer 12 portions are configured in positions to achieve the desirable more open shape. When conversion occurs, a position of the non-shape memory material 16 may be translated, but the material 16 itself is not deformed like the shape memory polymer 12.

While not shown in the FIG. 3 series, a material (similar to the material 14 used in the examples of the method depicted in FIGS. 1A through 1C and FIGS. 2A through 2C) is applied to at least one surface of the shape memory polymer 12 and the non-shape memory polymer 16, and, thereafter, the shape memory polymer 12 (in its temporary, more open shape 12") is reverted back into its permanent shape 12' (such reversion is not shown in the FIG. 3 series). Simultaneously or substantially simultaneously with the shape memory polymer 12 reverting back into its permanent shape 12', the position of the non-shape memory polymer 16 translates back into its original position (as shown in FIG. 3A). If desirable and/or necessary, the material 14 applied to the preform screen 20 is cured and is thereafter removed from the preform screen 20.

As previously mentioned, it is to be understood that examples of the method disclosed hereinabove may also be used to form a final part instead of a preform 10, 10'. For example, using the example of the method shown in FIGS. 1A through 1C, the permanent shape 12' of the shape memory polymer 12 is the predetermined part shape, and the material 14 sprayed onto the surface 18, when cured, forms the final part. In this example, the shape memory polymer 12 may be non-perforated, and may or may not be incorporated into the final part or product.

Also as previously mentioned, it is to be understood that the shape memory polymer 12 may be a final part, and the methods disclosed herein may be used to paint or apply another desirable coating to the final part.

It is also to be understood that examples of the method disclosed hereinabove may be used to form or coat various automotive and/or aerospace structural parts, internal cabin parts, and/or the like. However, the examples of the method may also be used to form or coat other parts that are used in applications outside of the automotive and/or aerospace industries. Non-limiting examples of the other parts include mirrors, glass structures, various electronic components, bathroom fixtures, drinking cups with ornamental designs, storage containers with multiple separators, and/or the like, and/or combination thereof.

While several embodiments have been described in detail, it will be apparent to those skilled in the art that the disclosed embodiments may be modified. Therefore, the foregoing description is to be considered exemplary rather than limiting.

The invention claimed is:

1. A method of using shape memory polymers, the method comprising: providing a shape memory polymer in a permanent shape, the permanent shape being at least part of a predetermined part shape; converting the shape memory polymer from the permanent shape into a temporary shape, the temporary shape being more open than the permanent shape; spraying a material onto at least one surface of the shape memory polymer in its temporary shape; reverting the shape memory polymer, having a material on at least one surface, back to the permanent shape; and after reverting the shape memory polymer to its permanent shape, then curing the material by applying heat thereto.

2. The method as defined in claim 1 wherein the converting of the shape memory polymer from the permanent shape into the temporary shape is accomplished by:
heating the shape memory polymer to a temperature above its switching temperature; and
applying a mechanical force to the shape memory polymer.

3. The method as defined in claim 2, further comprising cooling the shape memory polymer to a temperature below its switching temperature to temporarily fix the shape memory polymer into the temporary shape.

4. The method as defined in claim 1 wherein the shape memory polymer is perforated, and wherein prior to and during the spraying of the material, the method further comprises drawing a vacuum behind the at least one surface of the shape memory polymer.

5. The method as defined in claim 1 wherein the material includes carbon fibers, glass fibers, polyester fibers, natural fibers, basalt fibers, binder materials, paints, coatings, non-reinforced resins, particulate-reinforced resins, or combinations thereof.

6. The method as defined in claim 1 wherein reverting the shape memory polymer back to the permanent shape is accomplished by:
heating the shape memory polymer to a temperature above its switching temperature; and
cooling the shape memory polymer to a temperature below its switching temperature to substantially fix the shape memory polymer in the permanent shape.

7. A method of using shape memory polymers, the method comprising: providing a shape memory polymer in a permanent shape, the permanent shape being at least part of a predetermined part shape; converting the shape memory polymer from the permanent shape into a temporary shape, the temporary shape being more open than the permanent shape; spraying a material onto at least one surface of the shape memory polymer in its temporary shape; reverting the shape memory polymer, having a material on at least one surface, back to the permanent shape, the reverting being accomplished by: heating the shape memory polymer to a temperature above its switching temperature; cooling the shape memory polymer to a temperature below its switching temperature to substantially fix the shape memory polymer in the permanent shape; and after reverting the shape memory polymer to its permanent shape, then curing the material when the shape memory polymer is heated.

8. The method as defined in claim 1 wherein the shape memory polymer is integrated with a non-shape memory material such that the shape memory polymer in its permanent shape and the non-shape memory material together form the predetermined part shape, and wherein the non-shape memory material is moved, but not deformed, when the shape memory polymer is converted from the permanent shape into the temporary shape and when the shape memory polymer is reverted from the temporary shape back into the permanent shape.

9. The method as defined in claim 8 wherein the non-shape memory material has a melting temperature above a switching temperature of the shape memory polymer.

10. The method as defined in claim 8 wherein the non-shape memory material is a perforated metal, a perforated non-shape memory polymer, a perforated ceramic, perforated glass, or a combination thereof.

11. A method of using shape memory polymers, the method comprising:
providing a shape memory polymer in a permanent shape, the permanent shape being at least part of a predetermined part shape, wherein the shape memory polymer is a preform screen, and wherein the permanent shape of the shape memory polymer is at least a surface of the predetermined part shape;
converting the shape memory polymer from the permanent shape into a temporary shape, the temporary shape being more open than the permanent shape;
spraying a material onto at least one surface of the shape memory polymer in its temporary shape;
reverting the shape memory polymer, having the material on the at least one surface, back to the permanent shape;
after the reverting, curing the material, thereby forming a preform having the predetermined part shape; and
removing the preform from the shape memory polymer preform screen.

12. The method as defined in claim 11, further comprising molding a final part using the preform.

13. The method as defined in claim 1 wherein the shape memory polymer is a final part, and wherein the permanent shape of the shape memory polymer is the predetermined part shape.

14. The method as defined in claim 1 wherein permanent shape includes at least one channel having a first cross-section, and wherein the temporary shape includes the at least one channel having a second cross-section that is wider than the first cross-section.

15. The method as defined in claim 1 wherein the permanent shape includes a plurality of ribs having a first opening diameter, and wherein the temporary shape includes the plurality of ribs having a second opening diameter than is larger than the first opening diameter.

16. The method as defined in claim 1 wherein the shape memory polymer is non-perforated and is incorporated into a final product.

17. The method as defined in claim 6 wherein the curing of the material is accomplished when the shape memory polymer is heated.

18. The method as defined in claim 1 wherein the curing of the material is accomplished subsequent to reverting the shape memory polymer back into its permanent shape.

* * * * *